United States Patent [19]

Schisler

[11] 3,896,963

[45] July 29, 1975

[54] LININGS FOR CONTAINERS FOR HANDLING CORROSIVE CHEMICALS AND THE METHOD OF PREPARING SAID CONTAINERS

[75] Inventor: Robert C. Schisler, Akron, Ohio

[73] Assignee: The Goodyear Tire & Rubber Company, Akron, Ohio

[22] Filed: May 21, 1973

[21] Appl. No.: 362,607

[52] U.S. Cl............ 220/63 R; 220/64; 220/DIG. 24
[51] Int. Cl............................................. B65d 25/14
[58] Field of Search.............. 220/63 R, 64, DIG. 24

[56] References Cited
UNITED STATES PATENTS

| | | | |
|---|---|---|---|
| 2,189,787 | 2/1940 | Fitch........................... | 220/DIG. 24 |
| 2,471,905 | 5/1949 | Smith.................................... | 220/64 |
| 2,508,262 | 5/1950 | Jennings et al. .................. | 220/63 R |
| 2,522,135 | 9/1950 | Schaffer................................ | 220/64 |
| 2,631,953 | 3/1953 | Hubbard et al...................... | 220/64 |
| 2,821,294 | 1/1958 | Montgomery.................. | 220/63 R X |
| 2,956,915 | 10/1960 | Korn et al. ........................ | 220/63 R |
| 3,475,260 | 10/1969 | Stokes........................... | 220/63 R X |

*Primary Examiner*—John W. Huckert
*Assistant Examiner*—Charles Gorenstein
*Attorney, Agent, or Firm*—F. W. Brunner; R. P. Yaist

[57] ABSTRACT

A flexible corrosion-resistant lining structure for a container suitable for the handling of corrosive fluids and a method of preparing the container. The lining structure includes a base lining attached to the inwardly facing surface of the container and a protective cover of rubbery polymeric material attached only to that portion of the inwardly facing surface of the lining which confronts the corrosive substances in the vapor zone of the container. The cover includes an inwardly facing layer having resistance to cracking caused by the corrosive substances in the vapor zone. The invention is particularly useful for tanks containing hydrochloric acid.

20 Claims, 6 Drawing Figures

PATENTED JUL 29 1975

3,896,963

SHEET 1

LININGS FOR CONTAINERS FOR HANDLING CORROSIVE CHEMICALS AND THE METHOD OF PREPARING SAID CONTAINERS

BACKGROUND OF THE INVENTION

This invention relates to containers for the handling of corrosive fluids such as acids, alkalis, etc and more particularly to an improved flexible corrosion-resistant lining for such structures. The invention also relates to a method of preparing a container or tank suitable for the handling of corrosive chemicals.

It has been common in the prior art to fabricate tank lining of flexible corrosion-resistant material such as natural rubber, synthetic rubber, polyvinylchloride or the like for the purpose of preventing contact between the corrosive substances being transported or stored in the tank and the container walls which are usually metal. For example, in the lining of containers suitable for the transportation and storage of corrosive chemicals such as hydrochloric acid it has been common to provide a layer of natural rubber to cover the entire interior of storage tanks or railroad tank cars. Natural rubber has been particularly suitable as a lining material for use with halide acids such as hydrochloric acid since the halogen acid reacts with the elastomeric material to form a hard brittle surface. This surface condition of the natural rubber provides a protective barrier to the penetration of the acid thus effectively protecting the metal shell of the container for long periods of time.

Those skilled in the art are aware that certain problems do exist when elastomeric linings such as natural rubber linings are used, particularly with regard to the severe cracking of the lining after long and continuous use in an acid environment. It has been determined that this cracking is most severe in that portion of the elastomeric lining protecting the inner surface of the container shell which encloses the so-called "vapor zone" of the container. The "vapor zone", sometimes referred to as the outage area, for the purposes of the present invention is defined as the space directly above the liquid level in the tank between the surface of the liquid and the upper portion or ceiling of the container into which the deleterious vapors are emitted. By "liquid design level" is meant the level to which the tank is to be filled with corrosive liquid. Most acid tanks are filled to at least 90 percent of the volumetric capacity of the tank.

In the prior art, Montgomery U.S. Pat. No. 2,821,294 discloses a tank lining structure intended to overcome the above-mentioned problem. This patent discloses the use of an overlay of a semi-permeable membrane covering the interior surface of a rubber base lining which tends to diffuse the corrosive chemical at the rubber surface thereby inhibiting the transfer of the corrosive chemical through the rubber base lining to the metal shell. The soft elastomeric rubbery semi-permeable membrane overlay was preferably composed of neoprene but also could be made of other well-known elastomers not readily attached by corrosive chemicals. However, this lining structure has not proven to be entirely satisfactory since in some instances the overlay has swelled excessively and become delaminated or separated from the base lining. This is thought to be caused primarily by organic impurities which are commonly present in industrial grade acids. In addition, it has been found that in some instances the overlay covering the natural rubber base lining is not desirable since it prevents formation of the hardened protective surface at the interface of the rubber lining and the acid in the tank. Accordingly, when the semi-permeable layer is penetrated by acids or other corrosive substances, the relatively soft underlayer of natural rubber is more susceptible to attack by the acid. Furthermore, to provide a protective overlay to cover substantially the entire inwardly facing surface of the base tank lining is a costly procedure from an economic standpoint.

OBJECTS OF THE INVENTION

It is a primary object of the present invention to provide an improved lining structure for a container used in the transportation and storage of corrosive liquids.

It is also an important object of the present invention to provide a more economical lining for a container for handling corrosive chemicals and a more economical method of preparing the container.

It is another object of the present invention to provide a tank for containing hydrochloric acid having a protective cover disposed over the rubber base lining which will resist cracking in that portion of the tank that is exposed to the deleterious acid vapors in the vapor zone of the tank.

It is another object of the present invention to provide a tank lining having a protective cover or sheet which will be less susceptible to swelling caused by organic impurities contained in the tank.

Other objects and advantages of this invention will become apparent hereinafter as the description thereof proceeds, the novel features, arrangements and combinations being clearly pointed out in the specification as well as the claims thereunto appended.

In accordance with the present invention, it has been found that the above objects are accomplished in a container suitable for the handling of corrosive fluids including an outer rigid shell having a flexible corrosion-resistant lining attached to the inwardly facing surface thereof, a protective cover of rubbery polymeric material attached only to that portion of the inwardly facing surface of the lining which confronts the corrosive substances in the vapor zone of the container. The cover comprises a rubbery face layer disposed inwardly of the container, with the face layer having resistance to cracking caused by the corrosive substances in the vapor zone.

Although the cover may be composed of any of the well-known elastomers and polymers which are resistant in some measure to corrosive chemicals, it is preferred that the cover be comprised of at least one vulcanized rubbery polymer having a volume swell of less than 150 percent when tested for 12 months at 75°F in toluene in accordance with ASTM D471-72. This toluene swell test indicates which rubbery polymers have some resistance to the organic contaminants present in many corrosive chemicals. Accordingly, the cover is preferably comprised of at least one vulcanized rubbery polymer having low swell properties selected from the group consisting of butyl rubber, chlorobutyl rubber and acrylonitrile rubber.

Even more preferably the cover is comprised of such a polymer which is essentially impermeable to fluids such as acid liquids and vapors and is selected from the group consisting of butyl rubber and chlorobutyl rubber.

The invention may include at least one tie layer of rubbery polymeric material disposed between the base lining and the face layer to effect adhesion therebetween. In this regard the cover may be a composite structure comprised of at least one tie layer integrally bonded to the face layer.

In accordance with the present invention, it has also been found that a method of preparing a container suitable for the handling of corrosive chemicals having an outer rigid shell and a flexible corrosion-resistant lining attached to the inwardly facing surface of the shell comprises attaching a protective rubbery sheet of crack-resistant rubbery polymeric material only to that portion of the inwardly facing surface of the lining which confronts the vapor zone of the container. It is to be understood that the polymers of the present invention are required to either be vulcanized or as in the case of a thermoplastic material such as polyvinyl chloride, they are required to be crystalline in nature with a high degree of internal strength. It is also to be understood that for the purposes of this invention, the term "vullcanized" is used in its broadest sense to include all means of cross-linking rubbery polymers both with and without the use of sulphur.

DESCRIPTION OF THE PREFERRED EMBODIMENTS

Figure 1:
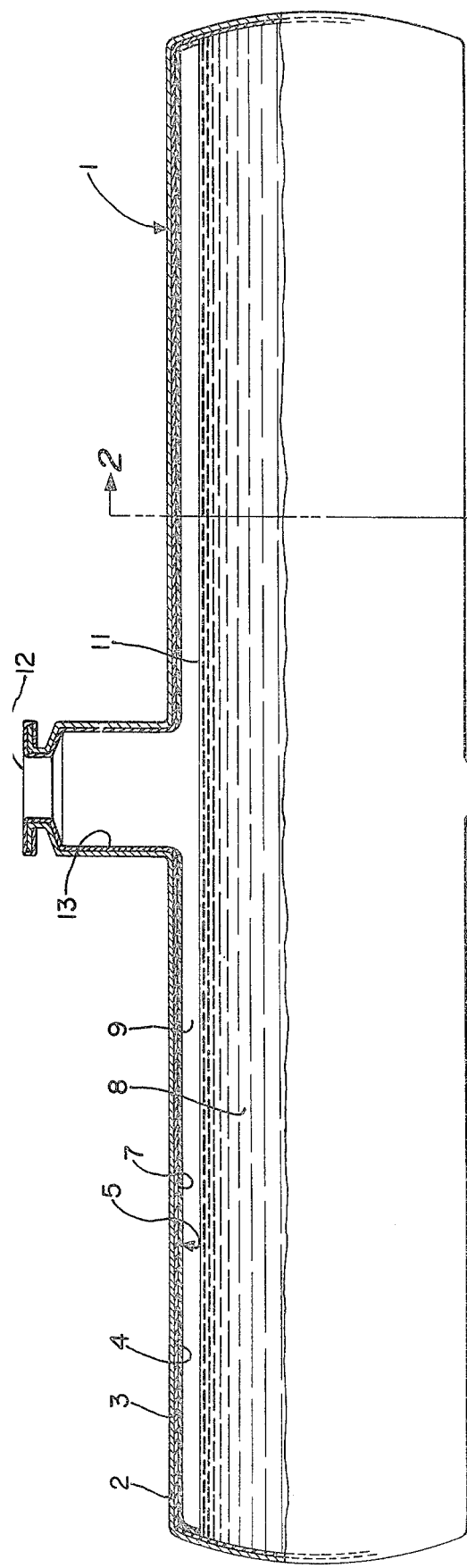
FIG. 1 is a side elevational view of a portion of a railroad tank car with parts broken away to more clearly show the invention.
Figure 2:
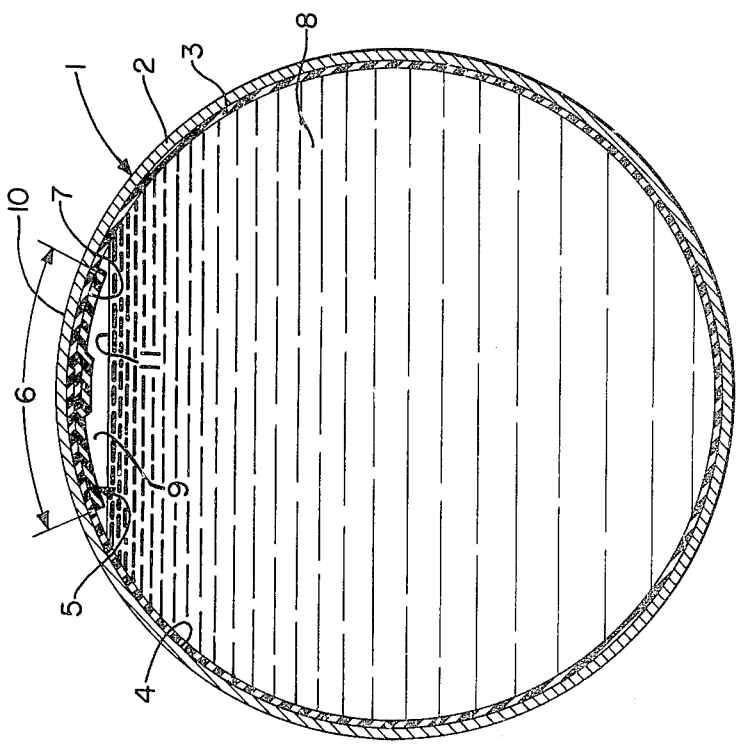
FIG. 2 is an enlarged sectional view taken on line 2—2 of FIG. 1.

In FIGS. 1 and 2 a container or tank 1 suitable for the handling of corrosive fluids such as hydrochloric acid is shown which in this instance is represented as the body of a railroad tank car. The tank 1 is generally cylindrical with its longitudinal axis disposed horizontally. The tank 1 includes an outer rigid shell 2 having a flexible corrosion-resistant lining 3 attached to its inwardly facing surface 4. A protective cover or sheet 5 of rubbery polymeric material is attached only to that portion 6 of the inwardly facing surface 7 of the lining 3 which confronts the corrosive acid 8 in the vapor zone 9 of the container. The vapor zone or outage area 9 is enclosed by an upper arcuate section 10 of the tank to which the lining 3 is attached. The section 10 extends generally longitudinally in the central region of the tank 1 as is best shown in FIG. 2.

It has been determined that the portion 6 of the base lining 3 disposed above the liquid or acid design level 11 of the tank when unprotected is subjected to the most severe attack from the corrosive substances 8 contained in the tank 1. This may be explained by the fact that the section or portion 6 of lining 3 is exposed not only to the vapors emitted from the liquid in the tank but also particularly in the case of a tank car which rolls over rails, it is subjected to the contact of the liquid which may be sloshed or splashed against the base lining during movement of the car. It is the normal practice to maintain a liquid volumetric capacity in the tank of at least 90 percent. Accordingly, only that portion 6 of the lining 3 disposed directly above the liquid 8 in the tank 1, usually enclosing no more than 10 percent of the volumetric capacity of the tank, is subjected to this most severe condition. Consequently, the protective cover 5 in the form of a sheet or strip is attached to the lining 3 in the section 6 exposed to corrosive vapors above the acid design level 11 of the tank 1 and the remainder of the lining 3 disposed below the acid design level 11 of the tank 1 being free of the cover 5.

A typical tank may have a volumetric capacity of about 8,500 gallons with a length of about 35 feet, a diameter of about 7 feet and will normally have an acid design level of approximately 6½ feet. The protective strip of a width of approximately 2 feet will cover the section 6 of the lining 3.

The tank 1 usually also includes a generally cylindrical manway 12 disposed substantially at the center of the upper arcuate portion 10 of the tank and raised upwardly from its outer periphery. Experience has shown that this same severe cracking condition does not exist in the interior of the manway area 13 of the tank and therefore the protective cover or sheet 5 is not necessary in the area 13 of the manway 12. Consequently as shown in FIG. 1, the cover 5 may be discontinuous in the area 13 of the manway 12.

Although the base rubber lining 3 may be composed of many non-corrosive materials, it is preferred for hydrochloric acid service that the lining be comprised of natural rubber or synthetic rubbers of a cis 1,4 polymer of isoprene known as synthesized "natural rubber". The protective cover 5 or overlay can be any of the known elastomers which are not readily attacked by corrosive chemicals such as the neoprenes, the rubbery copolymers of butadiene and styrene which may contain from 50 to 99 percent by weight of butadiene, polybutadiene, nitrile rubbers which are the rubbery copolymers of butadiene and acrylonitrile, chlorosulfonated polyethylenes which are known as hypalons, butyl rubber, and halogenated butyl rubber. In addition, rubbery thermoplastic polymeric materials such as polyvinyl chloride may also be used It is preferred that the cover 5 be comprised of at least one vulcanized rubbery polymer having a volume swell of less than 150 percent when tested for 12 months at 75°F in toluene in accordance with the method prescribed by the American Society for Testing and Materials (ASTM D-471-72). This test designed to measure volume swell in toluene indicates which rubbery polymers have at least some resistance to organic contaminates present in many corrosive chemicals. It has been found that the cover may be comprised of at least one vulcanized rubbery polymer having low swell properties selected from the group consisting of butyl rubber, chlorobutyl rubber and acrylonitrile rubber. It is most preferred that the cover be comprised of at least one polymer which is essentially impermeable to corrosive fluids and vapors. In this regard, the polymer may be selected from the group consisting of butyl rubber and chlorobutyl rubber.

Figure 3:
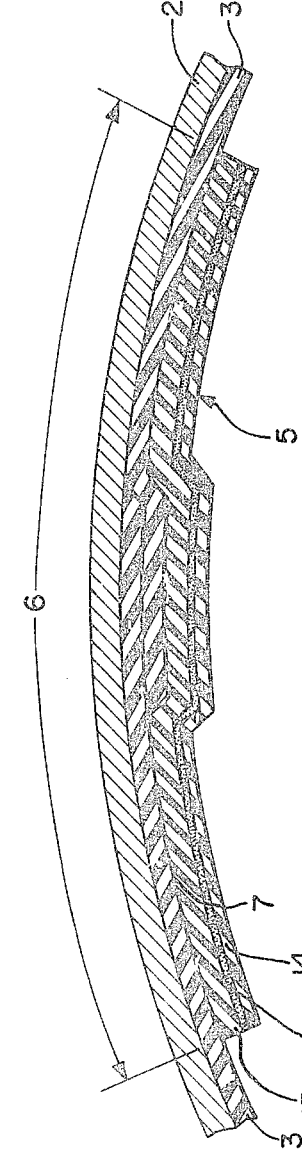
FIG. 3 is an enlarged section showing a portion of the invention of FIG. 2.

As best shown in FIG. 3, the protective cover includes a rubbery face layer 14 disposed inwardly of the container or tank 1. The face layer 14 has resistance to cracking caused by the corrosive substances in the vapor zone 9. Preferably, at least one tie layer of rubbery polymeric material is disposed between the base lining 3 and the face layer 14 to effect adhesion therebetween. It is preferred that the cover 5 be provided in the form of a composite structure including at least one tie layer integrally bonded to the face layer 14. As is best shown in FIG. 3, the cover 5 may include a base tie layer 15 of vulcanized rubbery polymeric material attached to the lining 3 and an intermediate tie layer 16 disposed between and integrally bonded to the base tie layer 15 and the face layer 14. It is preferred that the base tie layer 15 be comprised of a rubbery polymer of isoprene selected from the group consisting of natural rubber and synthetic rubber of a cis 1,4 polymer of isoprene. The intermediate layer 16 of the cover 5 may consist essentially of a blend of chlorobutyl rubber and a polymer of isoprene selected from the group consisting of natural rubber and synthetic rubber of a cis 1,4 polymer of isoprene. The face layer 14 of the cover 5 is comprised of a chlorobutyl rubber. The cover or sheet 5 may have a thickness of from about 0.050 to about 0.500 of an inch with the base tank lining 3 usually having a thickness of from about one-eighth to about one-half of an inch. The base tie layer 15, for example, may have a thickness of from about 0.020 to about 0.375 of an inch, the tie layer 16 may have a thickness of from about 0.005 to about 0.030 of an inch and the face layer 14 preferably has a thickness of from about 0.015 to about 0.495 of an inch.

Figure 4:
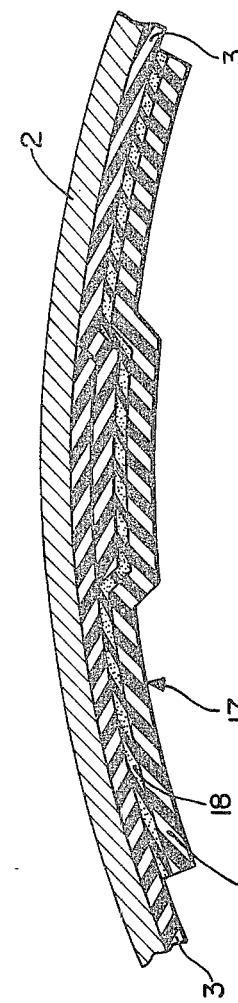
FIG. 4 is a modification of the invention shown in FIG. 3.

FIG. 4 illustrates that the lining structure may have a protective cover or overlay sheet 17 which includes only one tie layer 18 disposed between the base lining 3 and the face layer 14. The layer 18 may be comprised of any of the rubbery polymeric materials as used to form the layers 15 and 16 of FIG. 3. Alternatively, no tie layer may be necessary and the entire cover or sheet may be provided as a single layer attached to the base lining by means of a suitable adhesive.

Figure 5:
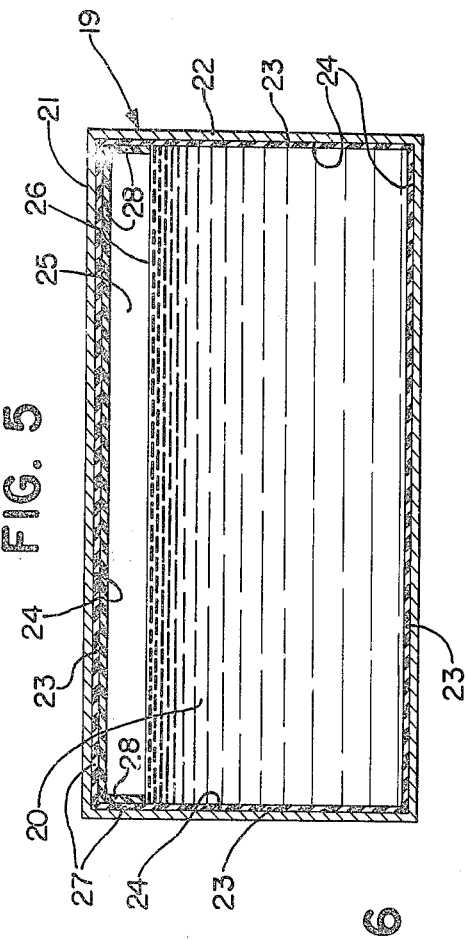
FIG. 5 is a perspective view of another type of tank made according to this invention.
Figure 6:
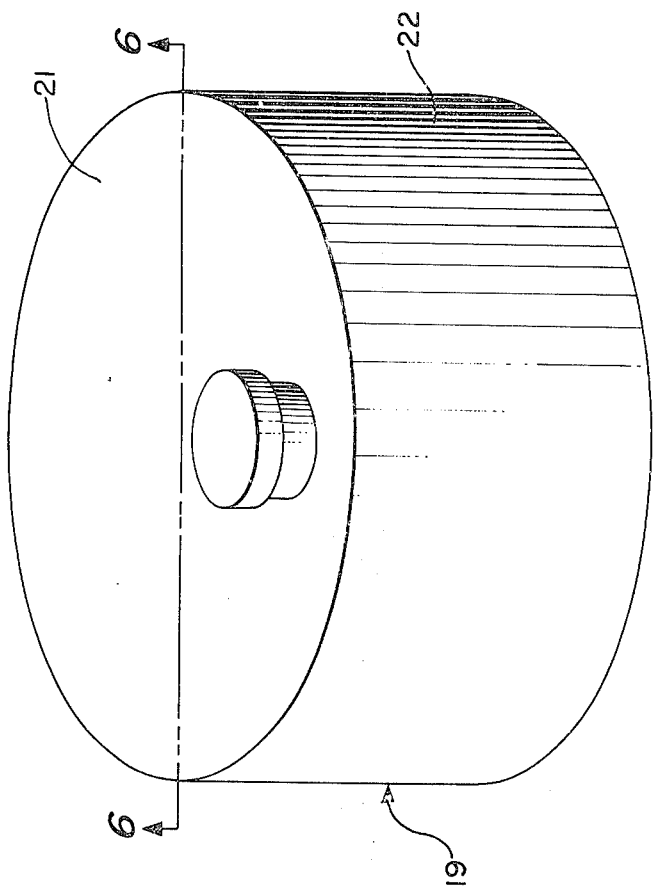
FIG. 6 is an enlarged section taken on line 6—6 of FIG. 5.

As illustrated in FIGS. 5 and 6, the container may be in the form of a storage tank 19 for containing corrosive substances such as hydrochloric acid 20 in which the tank is generally cylindrical having a planar top 21 and a generally cylindrical side wall 22 with its longitudinal axis disposed vertically. The tank includes a base lining 23 covering substantially its entire inwardly facing surface 24 with the vapor zone 25 disposed above the design acid level 26 of the tank 19 being enclosed by portions or sections 27 of the base lining 23 which cover the top 21 and a portion of the cylindrical side wall 22 adjacent to the top. A protective cover 28 in accordance with the present invention is superposed over and covers at least a substantial portion of the base lining sections 27. The lining 23 in the remainder of the tank 19 disposed below the liquid level 26 in the tank does not include the cover 28.

In the practice of this invention, the polyisoprene polymer is selected from the group consisting of natural rubber and synthetic rubber of a cis 1,4 polymer of isoprene which may contain up to 15 percent of the transpolymer and which are similar to natural rubber in structure and use. The natural rubber that can be used is any of the well-known types such as pale crepe and smoked sheet, chemically treated natural rubber or balata.

In accordance with the invention, a vulcanized rubbery polymer having a volume swell of less than 150 percent when tested for 12 months at 75°F in toluene in accordance with ASTM D-471-72 is at least one polymer selected from the group consisting of butyl rubber, chlorinated butyl rubber and acrylonitrile rubber.

Butyl rubber is a copolymer of a major proportion, preferably 85 to 99.5 weight percent of a multiolefin. The isoolefin is generally a C4-C8 olefin such as isobutylene or 3-methyl butene-1. Preferred is isobutylene. The multiolefin generally has about 4–14 carbon atoms; representative examples are myrcene, isoprene and butadiene. Preferred are isoprene and butadiene, most preferred is isoprene. The nature and production of butyl rubber is well described in the prior art, see U.S. Pat. No. 2,356,128, for example.

The halogenated butyl rubbers, often referred to as halobutyl rubber, are well known in the art being prepared normally by the halogenation of butyl rubber. Halobutyl rubbers include chlorobutyl as well as bromobutyl rubber. Descriptions of halobutyl rubber and its preparation appear in U.S. Pat. No. 3,242,148, the relevations of which are incorporated herein by reference. In chlorobutyl rubber, typically the chlorine content is less than 3 percent by weight normally being about 1.1 to about 1.3 weight percent. Normally about 75 percent of the unsaturation in the original butyl rubber is retained on chlorination, the unsaturation usually being from about 1.1 to about 1.7 percent. A typical molecular structure of Enjay Butyl HT Polymer is shown as follows:

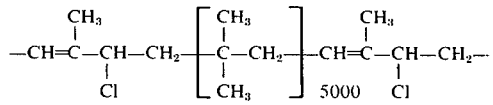

The compounding and vulcanization of chlorobutyl rubber is well known; see U.S. Pat. No. 3,197,446, the disclosures of which are incorporated herein by reference. Sulfur and accelerator combinations or zinc oxide, zinc chloride, diamines and dithiols are examples of compounds which can be used in the vulcanization of halobutyl rubber. Bromobutyl rubber is similar to chlorobutyl rubber, the main difference being that it contains bromo groups rather than chloro groups. Butyl rubbers containing both chloro and bromo groups can also be used.

Halogenated butyl rubbers are also described in the *Encyclopedia of Chemical Technology*, Second Supplement Volume edited by Raymond E Kirk and Donald F Othmer, The Interscience Encyclopedia, Inc., New York, pages 716 to 734, and the *Encyclopedia of Polymer Science and Technology*, Vol. 2, Interscience Publishers, a division of John Wiley & Sons, Inc., New York, London, Sidney, pages 762, 763, 771, 772 and 782. The revelations of these references are incorporated herein by reference.

The nitrile rubber compositions that may be employed in the practice of the present invention are a vulcanized rubbery copolymer of butadiene and acrylonitrile of the type disclosed in *Rubber Chemistry and Technology* "A Rubber Review for 1963 Nitrile Rubber by W. Hofman", Volume 37, April-June 1964, Part 2.

The vulcanized rubbery polymers of the present invention may be compounded in the customary manner with conventional rubber compounding ingredients such as fillers, curing agents, accelerators, retarders, anti-oxidants and softeners. Conventional curing agents such as, for example, sulphur or an organic peroxide, etc., and one of the customary accelerators such as thiazole, a dithiocarbamate and/or other known organic accelerators may be used in the curing of the polymers of the present invention.

In the method of preparing a container suitable for the handling of corrosive chemicals, the lining structure may be applied to the clean walls of the tank in any known manner. In the preferred practice, the rubber base is calendered to the desired thickness and applied over the interior surfaces of the metal shell of the tank. The protective cover is preferably calendered in a continuous operation with one or more tie layers if desired being provided during the calendering operation. Thereafter, the calendered sheets are applied to that portion of the base lining of the tank which will confront the corrosive vapors in the vapor zone of the tank. The calendered sheets are applied to the base lining in a conventional manner with or without the use of adhesives. Also, the base rubber can be applied to the tank walls as calendered sheets after which the protective cover can be applied as a calendered sheet or as a fluid. If desired, both the base lining layer and the protective cover layer may be applied in the form of fluids by spraying, painting, etc. When the base lining is applied in the form of calendered sheets, it is preferred to use an adhesive system in order to insure greater permanency of the bond between the base lining and the container walls. Any of the commonly known adhesives for securing rubber to metal bonds can be used for this purpose, examples of which are commercially available formulated adhesives such as the CHEMLOK adhesives available from Lord Corporation of Erie, Pennsylvania and THIXON adhesives available from Dayton Chemical Products, Dayton, Ohio. Of course, other well-known adhesives such as chlorinated rubber, cyclized rubbers and epoxy resins may also be used. In order to obtain sufficient tack between the rubber base lining and the metal adhesive, an elastomeric cement may be used as is well known in the art. It is preferred to use an adhesive between the cover or sheet and the base layer such as one of the above adhesives or an elastomeric cement.

After the lining structure has been applied to the tank, curing may be accomplished by any of the customary methods used in curing tank linings. For example, small containers may have the lining structures cured by inserting the entire tank into a standard heater and large tanks may be cured by means of live steam with or without pressure. Customarily, the vulcanization temperature will range from about 170° to 320°F.

The following examples further illustrate the objects and advantages of this invention.

EXAMPLE I

Test samples identified as Samples A and B were made in the following manner. Sample A was formed from a compounded natural rubber formulation, equivalent to composition I below, which was cured in a rubber curing press, at 1500 psi ram pressure, at a temperature of 290°F., for 45 minutes. The rubber mold in which Sample A was cured was 2 inches by 4 inches by 0.250 of an inch.

Sample B made in accordance with the present invention was formed from a compounded natural rubber formulation, equivalent to composition I below, and was milled and cut to an approximate size of 2 inches by 4 inches by ¼ of an inch. It was completely covered with one layer of a compounded chlorobutyl/natural rubber formulation, equivalent to composition II below, having a thickness of approximately 0.20 of an inch. The chlorobutyl/natural rubber layer serving as a tie layer was then completely covered with one layer, approximately 0.030 of an inch thick, of a compounded chlorobutyl rubber formulation, equivalent to composition III below. This laminate was then cured in a rubber press, at 1500 psi ram pressure, at a temperature of 290°F. for 45 minutes, in a 2 inch by 4 inch by 0.250 of an inch rubber mold to form a composite structure with the layer of chlorobutyl rubber acting as a face layer.

The two cured Samples A and B were suspended in the vapor phase of a closed container filled approximately half full with 37 percent hydrochloric acid, and maintained at a temperature of 125°F. The samples were inspected after 15 days in the acid vapors. The inspection indicated that Sample A had progressively hardened and became brittle on the surface and cracked when flexed or bent. Sample B made in accordance with the present invention showed no tendency to harden or become brittle or crack and, furthermore, did not crack when flexed or bent. This test clearly demonstrated the improved crack resistance of the lining structure of this invention over conventional lining structures.

|  | Parts By Weight | | |
| --- | --- | --- | --- |
|  | I | II | III |
| Crude Natural Rubber | 100.00 | 30.00 | — |
| Chlorobutyl Rubber(1) | — | 70.00 | 100.00 |
| Zinc Oxide | 5.00 | 5.00 | 5.00 |
| Carbon Black | 70.00 | 50.00 | 50.00 |
| Barium Sulfate | — | 75.00 | — |
| Stearic Acid | 1.00 | 1.00 | 1.00 |
| Coumarone Indene Resin | 10.00 | — | — |
| Paraffinic Oil | — | 10.00 | 10.00 |
| Antioxidant | 2.00 | — | 1.00 |
| Vulcanizing Agents | 3.50 | 4.00 | 3.00 |
|  | 191.50 | 245.00 | 170.00 |

(1)Enjay Butyl HT 1066 Polymer

In composition I the carbon black used is of the thermal type. In composition II the carbon black is a blend of thermal and a semi-reinforcing furnace type and in composition III is a blend of a high abrasion furnace and a fast extruding furnace type. The vulcanizing agents used in compositions I and II are of the sulfur and sulfur donor type with thiazole acceleration (such as mercaptobenzothiazole). In composition III the vulcanizing agents are of the sulfur donor type with thiuram and thiazole acceleration. The above formulations are expressed in proportions on the basis of party by weight based on the weight of the polymer used.

EXAMPLE II

A tank car 1 of the type shown in FIGS. 1 and 2 was prepared in accordance with the present invention as follows. An unvulcanized tank lining sheet to be used as a base lining 3 as shown in FIGS. 1–3 was formed by calendering a natural rubber formulation, equivalent to composition I of Example I, to a gauge or thickness of three-sixteenths of an inch.

An unvulcanized overlay sheet of the type shown in FIG. 3 and designated by numeral 5 was prepared by calendering a natural rubber formulation, equivalent to composition I, to a gauge of 0.075 of an inch thereby forming the tie layer 15. One ply of a chlorobutyl/natural rubber blend compound, equivalent to composition II of Example I, was calendered onto the layer 15 of natural rubber at a gauge of 0.020 of an inch to form the tie layer 16. A chlorobutyl formulation, equivalent to composition III of Example I, was then calendered onto the chlorobutyl/natural rubber layer 16 to a gauge of 0.030 of an inch to form the face layer 14. A composite overlay sheet 5 was thereby formed including layers 14, 15 and 16.

The unvulcanized base tank lining sheet 3 and the unvulcanized overlay sheet 5 were then shipped to a tank lining applicator to be used to line a railroad tank car 1 (steel tank). The instructions for lining the car 1 were as follows. First, the car is prepared by sandblasting the interior surface of the shell 2 of the tank to achieve a chean white metal surface. The interior surface of the shell is then primed with one coat of a suitable metal adhesive (Chemlock 220, obtained from Lord Corporation of Erie, Pa.) The primer coat is covered with one coat of a natural rubber tack cement and one coat of the same natural rubber tack cement is also applied to the backside of the unvulcanized base rubber lining sheet 3. The interior of the car is then completely lined with the prepared sheet 3 using standard rubber lining techniques well known in the art.

The overlay sheet 5 is trimmed to a width of 24 inches and the surface to come in contact with the base lining 3 is prepared by applying a natural rubber tack cement. The portion 6 of the rubber lining 3 in the upper part of the tank is also coated with a natural rubber tack cement. The prepared overlay strip 5 is then applied to the lining 3 in the section 6 which will be exposed to corrosive vapors in the vapor zone 9 above the acid design level 11 of the tank. The application of the strip 5 is accomplished by any of the various well-known techniques for that purpose. The strip 5 is positioned in the tank car 1 as shown in FIGS. 1 and 2 and is discontinuous in the area of the manway 12.

The lined tank car is vulcanized by pressurizing with steam at 30 psig for 4½ hours.

The tank car is currently in service carrying concentrated hydrochloric acid with no problems reported at this time.

While certain representative embodiments and details have been shown for the purpose of illustrating the invention, it will be apparent to those skilled in this art that various changes and modifications may be made therein without departing from the spirit or scope of the invention.

What is claimed is:

1. In a container suitable for the handling of corrosive fluids including an outer rigid shell having a flexible corrosion-resistant lining attached to the inwardly facing surface thereof, a protective cover of rubbery polymeric material attached only to that portion of the inwardly facing surface of the lining which confronts the corrosive substances in the vapor zone of the container with the remainder of the lining being free of said cover, said cover comprising a rubbery face layer disposed inwardly of the container, said face layer having resistance to cracking caused by the corrosive substances in the vapor zone.

2. The invention as claimed in claim 1 wherein said cover is comprised of at least one vulcanized rubbery polymer having a volume swell of less than 150 percent when tested for 12 months at 75°F in toluene in accordance with ASTM D-471-72.

3. The invention as claimed in claim 1 wherein said cover is comprised of at least one vulcanized rubbery polymer having low swell properties selected from the group consisting of butyl rubber, chlorobutyl rubber and acrylonitrile rubber.

4. The invention as claimed in claim 1 wherein at least one tie layer of rubbery polymeric material is disposed between the lining and said face layer to effect adhesion therebetween.

5. The invention as claimed in claim 4 wherein said cover is a composite structure comprised of at least one said tie layer integrally bonded to said face layer.

6. The invention as claimed in claim 5 wherein said cover includes a base tie layer of vulcanized rubbery polymeric material attached to the lining and an intermediate tie layer disposed between and integrally bonded to said base tie layer and said face layer.

7. The invention as claimed in claim 6 wherein the lining and the base tie layer of said cover are comprised of a rubbery polymer of isoprene selected from the group consisting of natural rubber and synthetic rubber of a cis 1,4 polymer of isoprene, the intermediate tie layer of said cover consists essentially of a blend of chlorobutyl rubber and a polymer of isoprene selected from the group consisting of natural rubber and synthetic rubber of a cis 1,4 polymer of isoprene, and the face layer of said cover is comprised of chlorobutyl rubber.

8. In a tank for containing hydrochloric acid including the combination of an outer rigid shell, a flexible lining of natural rubber attached to and covering substantially the entire inwardly facing surface of the shell with the shell enclosing a vapor zone disposed above the acid design level of the tank, the improvement comprising a protective rubbery overlay sheet having a face layer of crack-resistant rubbery polymeric material, said sheet attached to that portion of the inwardly facing surface of the lining which would otherwise be exposed to the corrosive substances in the vapor zone of the tank so that said sheet will contact the acid vapors emitted from the acid in the tank and said sheet being restricted to said portion so that the remainder of said lining disposed below the acid design level of the tank which will contact the acid being free of said sheet.

9. The invention as claimed in claim 8 wherein the tank is generally cylindrical with its longitudinal axis disposed horizontally and the vapor zone is enclosed by an arcuate section of the lining extending generally longitudinally on the central region of the upper arcuate portion of the tank, said sheet covering at least a substantial portion of said section.

10. The invention as claimed in claim 9 wherein the tank includes a generally cylindrical manway disposed substantially at the center of the upper portion of the tank and raised upwardly therefrom above the outer periphery thereof and said sheet is discontinuous in the area of said manway.

11. The invention as claimed in claim 8 wherein the tank is generally cylindrical having a planar top and a generally cylindrical side wall with its longitudinal axis disposed vertically and the vapor zone is enclosed by a section of the lining which covers the top and a portion of the cylindrical side wall adjacent to the top, said sheet covering at least a substantial portion of said section.

12. The invention as claimed in claim 8 wherein said sheet is comprised of at least one vulcanized polymer having a volume swell of less than 150 percent when tested for 12 months at 75°F in toluene in accordance with ASTM D-471-72.

13. The invention as claimed in claim 12 wherein said sheet is comprised of at least one polymer which is essentially impermeable to corrosive fluids, said polymer being selected from the group consisting of butyl rubber and chlorobutyl rubber.

14. The invention as claimed in claim 8 wherein said sheet is about 0.050 to about 0.500 inch thick.

15. The invention as claimed in claim 8 wherein said sheet is a composite structure comprised of at least one tie layer integrally bonded to said face layer.

16. The invention as claimed in claim 15 wherein the lining has a thickness of from about one-eighth to about one-half of an inch, the tie layer has a thickness of from about 0.005 to about 0.030 and the face layer has a thickness of from about 0.015 to about 0.495 of an inch.

17. The invention as claimed in claim 15 wherein said sheet further includes a base tie layer of vulcanized rubbery polymer material attached to the lining and said first mentioned tie layer is an intermediate tie layer disposed between and integrally bonded to said base layer and said face layer.

18. The invention as claimed in claim 17 wherein the base tie layer of said sheet is comprised of a rubbery polymer of isoprene selected from the group consisting of natural rubber and synthetic rubber of a cis 1,4 polymer of isoprene, the intermediate tie layer of said sheet consists essentially of a blend of chlorobutyl rubber and a polymer of isoprene selected from the group consisting of natural rubber and synthetic rubber of a cis 1,4 polymer of isoprene, and the face layer of said sheet is comprised of chlorobutyl rubber.

19. The method of preparing a container suitable for the handling of corrosive chemicals having an outer rigid shell and a flexible corrosion-resistant lining attached to the inwardly facing surface of the shell, said method comprising attaching a protective rubbery sheet of crack-resistant rubbery polymeric material only to that portion of the inwardly facing surface of the lining which confronts the vapor zone of the container and restricting said sheet to said portion so that the remainder of said lining which does not confront the vapor zone of the container is free of said sheet.

20. The method as claimed in claim 19 comprising bonding at least one tie layer of rubbery polymeric material to a face layer of crack-resistant rubbery polymeric material to form a laminated protective overlay sheet, adhering said sheet to said base lining with at least one said tie layer adhered to the lining and curing said sheet and said lining to form an integral composite laminate of corrosion-resistant rubbery material in the area of the container which is exposed to the corrosive substances in the vapor zone of the container.

* * * * *

UNITED STATES PATENT OFFICE
CERTIFICATE OF CORRECTION

PATENT NO. : 3,896,963
DATED : July 29, 1975
INVENTOR(S) : Robert C Schisler

It is certified that error appears in the above-identified patent and that said Letters Patent are hereby corrected as shown below:

Column 1, line 61, "attached" should read --attacked--.

Column 3, line 22, "vullcanized" should read --vulcanized--.

Column 6, line 22, "relevation" should read -- revelation --.

Column 9, line 19, "chean" should read -- clean --.

Signed and Sealed this ninth Day of December 1975

[SEAL]

Attest:

RUTH C. MASON
Attesting Officer

C. MARSHALL DANN
Commissioner of Patents and Trademarks